(12) United States Patent
Scaria et al.

(10) Patent No.: US 11,544,635 B2
(45) Date of Patent: Jan. 3, 2023

(54) USER INPUT CONFIGURED DYNAMIC SHUTTLE

(71) Applicant: Ford Global Technologies, LLC, Dearborn, MI (US)

(72) Inventors: Lisa Scaria, Dearborn, MI (US); Candice Xu, Dearborn, MI (US); Brielle Reiff, Dearborn, MI (US); Henry Salvatore Savage, Dearborn, MI (US); Sarah Houts, Dearborn, MI (US); Jinhyong Oh, Dearborn, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 714 days.

(21) Appl. No.: 16/480,006

(22) PCT Filed: Jan. 31, 2017

(86) PCT No.: PCT/US2017/015806
§ 371 (c)(1),
(2) Date: Jul. 23, 2019

(87) PCT Pub. No.: WO2018/143932
PCT Pub. Date: Aug. 9, 2018

(65) Prior Publication Data
US 2019/0370701 A1 Dec. 5, 2019

(51) Int. Cl.
*G06Q 10/02* (2012.01)
*B60N 2/01* (2006.01)
(Continued)

(52) U.S. Cl.
CPC ............ *G06Q 10/02* (2013.01); *B60N 2/01* (2013.01); *B60N 2/0292* (2013.01);
(Continued)

(58) Field of Classification Search
CPC ........ G06Q 10/02; B60N 2/01; B60N 2/0292; B60N 2/0296; G05D 1/0225; G05D 1/0285; G05D 2201/0212
See application file for complete search history.

(56) References Cited

U.S. PATENT DOCUMENTS

| 4,432,583 | A | * | 2/1984 | Russo | B60N 2/0296 248/394 |
| 5,947,541 | A | * | 9/1999 | Behrens | B60N 2/01 296/64 |

(Continued)

OTHER PUBLICATIONS

Chinese Patent Application No. 2017800852446, Chinese Office Action dated Sep. 5, 2022.

*Primary Examiner* — Hunter B Lonsberry
*Assistant Examiner* — Harrison Heflin
(74) *Attorney, Agent, or Firm* — Brandon Hicks; Eversheds Sutherland (US) LLP (57) ABSTRACT

Systems, methods, and devices for reserving a vehicle with a desired vehicle characteristic are disclosed herein. A system includes a receiver to receive a request to reserve a vehicle, wherein the request indicates a desired vehicle characteristic. The system includes a controller configured to determine a change to the vehicle that will satisfy the vehicle characteristic, and the system includes an implementation component configured to implement the change to the vehicle.

19 Claims, 10 Drawing Sheets

(51) Int. Cl.
*B60N 2/02* (2006.01)
*G05D 1/02* (2020.01)

(52) U.S. Cl.
CPC ......... *B60N 2/0296* (2013.01); *G05D 1/0225* (2013.01); *G05D 1/0285* (2013.01); *G05D 2201/0212* (2013.01)

(56) References Cited

U.S. PATENT DOCUMENTS

| | | | |
|---|---|---|---|
| 9,953,283 B2* | 4/2018 | Sweeney | G07C 5/008 |
| 11,117,534 B2* | 9/2021 | Coburn | H04W 4/40 |
| 2014/0222298 A1 | 8/2014 | Gurin | |
| 2015/0057839 A1* | 2/2015 | Chang | B60R 16/0373 |
| | | | 701/2 |
| 2017/0045890 A1* | 2/2017 | Gurin | H04N 7/181 |
| 2017/0316696 A1* | 11/2017 | Bartel | B60W 50/0098 |
| 2017/0334313 A1* | 11/2017 | Ahn | B60N 2/206 |
| 2018/0105071 A1* | 4/2018 | Lange-Mao | B60N 2/0296 |

* cited by examiner

USER INPUT CONFIGURED DYNAMIC SHUTTLE

TECHNICAL FIELD

The disclosure relates generally to methods, systems, and apparatuses for reserving a vehicle with a desired vehicle characteristic, and particularly to implementing a change to a vehicle configuration to satisfy the desired vehicle characteristic.

BACKGROUND

Ride sharing allows users to request or reserve a vehicle for travel. With ride sharing options, users may find it possible to meet their transportation needs without purchasing or owning their own vehicle.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Reserving a vehicle for transportation is becoming a popular method of transportation because passengers may, among other things, obtain convenient and private transportation and share transportations costs. Embodiments disclosed herein may allow a user to reserve a vehicle that may be driven by an operator, reserve an autonomous vehicle that may drive itself, or reserve a vehicle that the user will personally drive. Users may request different vehicle characteristics depending on the purpose of the transportation, the number of passengers on the transportation, and where the user needs the transportation. Different vehicles may have different characteristics that may be desirable to passengers, such as particular seat orientations or configurations, workspace configurations, storage configurations, or specialized options such as electronic charging ports, televisions, monitors, and the like. It may be beneficial to permit a passenger to reserve a particular vehicle with a particular characteristic prior to a trip.

Applicants have developed systems, methods, and devices for reserving a vehicle with a desired vehicle characteristic. According to one embodiment, a method includes receiving a request to reserve a vehicle, wherein the request indicates a desired vehicle characteristic, identifying an available vehicle capable of providing the vehicle characteristic, determining a change to the vehicle to provide the vehicle characteristic, reserving the vehicle, and providing a notification to the vehicle or operator of the change and the reservation.

For example, in an implementation, a passenger is provided with options to reserve a vehicle with a desired vehicle characteristic. A system may present the user with options to reserve a vehicle with a workspace having a table, an electronic charging port, a monitor, and/or a conference area where a plurality of passengers might face each other and converse during transit. The user may select options indicating a particular pickup location, pickup time, driving route, and drop-off location. The user may also be presented with options to indicate whether a passenger will have a particular medical need and/or may require additional space on the vehicle. To increase the customizability and efficiency of a vehicle that is available for reservation, the vehicle may include an onboard dynamic grid system that permits the vehicle configuration to be altered with or without manual intervention. The dynamic grid system might, for example, rearrange a selection of options to meet the user's requests such that the user's requested vehicle configuration is available for use at the pickup time and location. In an implementation, a system receives the user's request, identifies an available vehicle that is capable of satisfying the user's request, determines how the vehicle might be changed to satisfy the user's request, notifies the user that the vehicle has been reserved, and implements the change without manual intervention before the requested pickup time.

Further embodiments and examples will be discussed in relation to the figures below.

Figure 1:
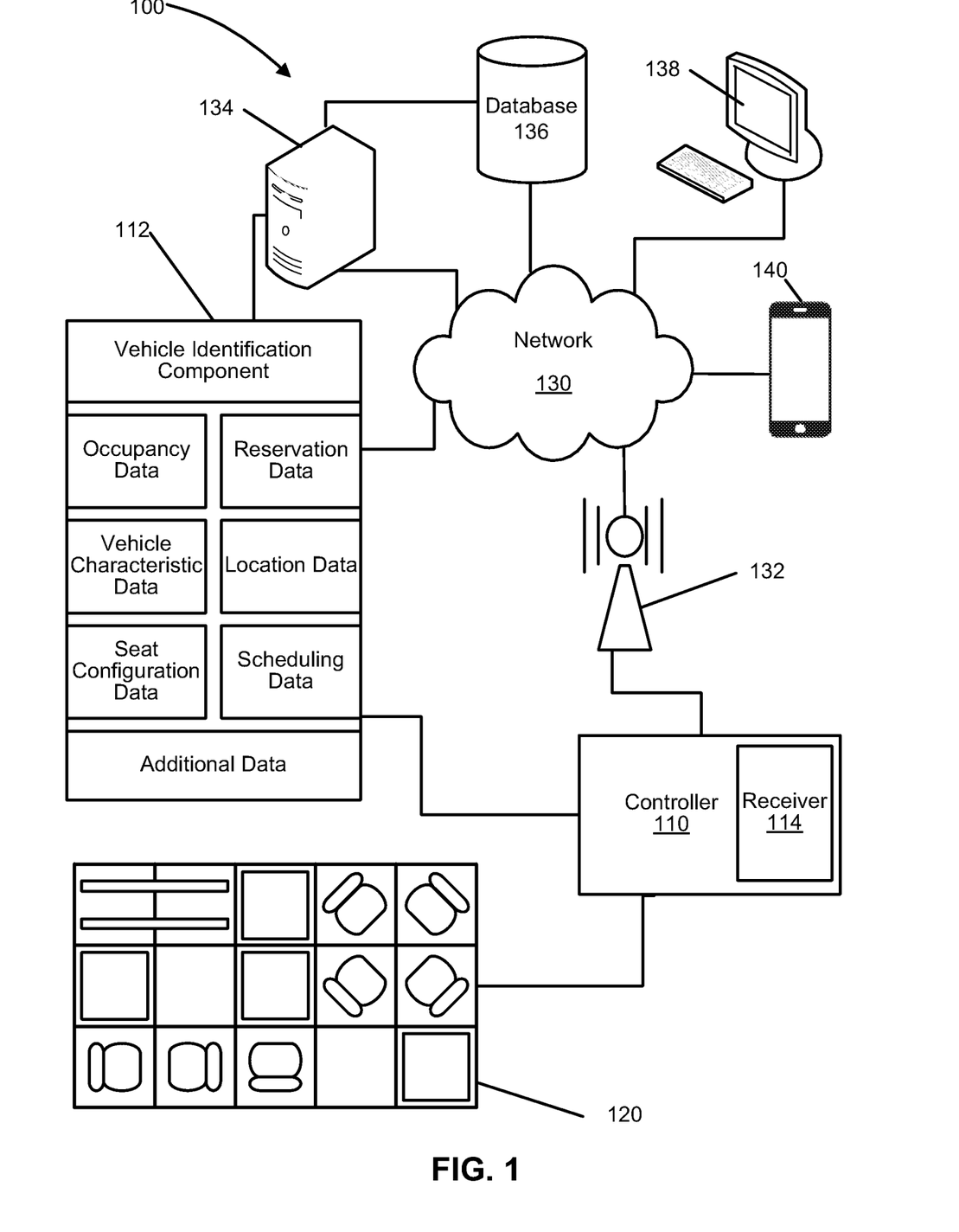
FIG. 1 is a schematic diagram illustrating a dynamic vehicle reservation system, according to one implementation.

FIG. 1 is a schematic diagram of a dynamic vehicle reservation system 100, according to one implementation. The system 100 includes a dynamic grid system 120 in a vehicle. The system 100 further includes a controller 110 that is electronically connected to or in electronic communication with the dynamic grid system 120. The controller 110 includes a receiver 114 to receive data from a remote source. In one embodiment, the controller 110 determines and implements a change to an internal configuration of the vehicle with the dynamic grid system 120. The controller 110 may be in electronic communication with a network interface 132. The network interface 132 may provide network 130 access to the controller 110. The system 100 includes a dynamic reservation server 134 providing a web-based user interface on a display on a computer 138 or a mobile device 140. The system 100 includes a database 136 that stores data such as occupancy data, vehicle reservation data, vehicle characteristic data, location data, vehicle configuration data, scheduling data, operational historical data, user data, occupancy status data, and other data that may be used in the dynamic reservation system 100.

The system 100 further includes a vehicle identification component 112 that uses data from a plurality of sources or databases for identifying a vehicle or a change to a vehicle that complies with a reservation request from a user. The reservation request may include a set of specialized parameters. It should be noted that the network 130 may be a cloud computing network, and/or the Internet, and/or part of a closed or private network without departing from the scope of the disclosure.

The controller 110 may be located within a vehicle, or other location and be electronically connected to or in electronic communication with the dynamic grid system 120. The controller may determine and implement a change to a vehicle configuration with the dynamic grid system 120. In one embodiment, the controller 110 is in electronic communication with a network interface 132 that connects the controller 110 to a network 130. In one embodiment, the controller 110 receives a vehicle configuration scheme that includes, for example, a requested change to a vehicle or a set of instructions for changing a characteristic of a vehicle. The controller 110 may receive the vehicle configuration scheme over a network 130 by way of the receiver 114 and then implement the vehicle configuration scheme using the dynamic grid system 120. In one implementation, the controller 110 is configured to determine, alter, or override the vehicle configuration scheme received over a network 130 based on a user input that may be received over a network 130 or input directly into the controller 110.

In an implementation, the controller 110 includes a screen or user interface that allows a user to, for example, input data, alter a vehicle configuration scheme, override a vehicle configuration scheme, or check a status of a vehicle configuration scheme. The controller may be located within the vehicle and it may be electronically connected to a dynamic grid system 120 that automatically implements a vehicle configuration scheme.

In an implementation, the receiver 114 receives a request to reserve a vehicle and the request may include a desired vehicle characteristic. The desired vehicle characteristic may include, for example, a seat configuration, a seat orientation, a workspace configuration, a storage configuration, or a seat characteristic. In an implementation, the receiver 114 may be configured to receive data from any data source, such as a database 136, a computer 138, a mobile device 140, a sensor, or a user input. The receiver 114 may receive data from, for example, a network 130, a direct electronic communication with a data source, or a user input into the controller 110.

In an implementation, a plurality of data sources and user interfaces are connected to the system 100 over a network 130. A dynamic reservation server 134 may provide a web-based or locally installed user interface that may be accessed from, for example, a computer 138 or a mobile device 140. The dynamic reservation server 134 may provide an interface that prompts a user, such as a driver or a passenger, to input data that may be communicated to the network 130. User-inputted data may include, for example, vehicle route data, vehicle characteristic data, seating configuration data, seating orientation data, workspace configuration data, storage configuration data, seating characteristic data, reservation data, reservation preference data, and desired vehicle characteristic data. In an implementation, a passenger uses a mobile device 140 or a computer 138 to reserve a vehicle, select a desired vehicle characteristic, a desired vehicle pickup time, and a desired vehicle route, among other things. The data may be communicated to the vehicle identification component 112 and the controller 110 to identify an available vehicle capable of providing the desired vehicle characteristic, identify a change to the vehicle to provide the desired vehicle characteristic, and implement the change so the vehicle is prepared for the user or passenger at the desired vehicle pickup time.

In an implementation, the system 100 includes a database 136 that is in communication with the network 130 and/or the dynamic reservation server 134. The database 136 may include any data that is useful for the operation of the system 100. In one embodiment, the data includes, vehicle route data, passenger preference data, driver preference data, occupancy data, reservation status data, location data, seat configuration data, seat orientation data, workspace configuration data, storage configuration data, and any additional data. In an implementation, a user such as a passenger or a driver inputs data that to be stored in the database 136 and retrieved at a later time.

In an implementation, a passenger reserves a vehicle and selects a desired vehicle characteristic such as a particular seat orientation or configuration, a workspace configuration, a storage configuration, or a seating characteristic. The passenger may receive a notification that a vehicle with the desired vehicle characteristic has been reserved for the passenger and will be available at a particular pickup time and location. For example, the passenger may possess a mobile device 140 that transmits the location of the passenger over the network 130 to the controller 110. The controller 110 may receive an indication that the passenger's mobile device 140 is within a close proximity to the vehicle, and the controller 110 may then engage the dynamic grid system 120 to alter the vehicle configuration to meet the desired vehicle characteristic, and/or the controller 110 may engage an autonomous vehicle driving system to drive the vehicle to the passenger's location without manual intervention.

In an implementation, a characteristic of the vehicle is changed to meet the desired vehicle characteristic when a passenger is in close proximity to the vehicle. "Close proximity" may be defined as, for example, a physical distance or a time. For example, the dynamic grid system 120 may be engaged to alter a configuration of the interior of the vehicle when the passenger's reserved time for pickup is approaching, for example the dynamic grid system 120 may be engaged at one hour, thirty minutes, ten minutes, one minute, a number of seconds, or any other amount of time before the pickup time. For example, the dynamic grid system 120 may be engaged when the vehicle approaches the reserved pickup location or the vehicle approaches the passenger.

In an implementation, the passenger possesses a mobile device 140 that indicates a location of the passenger over a network 130, and the vehicle includes a GPS that indicates a location of the vehicle over a network 130. In such an implementation, the controller 110 may engage the dynamic grid system 120 to change a characteristic of the vehicle to meet the passenger's desired vehicle characteristic when the passenger and the vehicle are within a threshold distance from each other. In an implementation, an operator of the vehicle makes an indication to the controller 110 to engage the dynamic grid system 120 when the vehicle is approaching the pickup location or when the operator is within a visual distance of the passenger.

In an implementation, the controller 110 determines a vehicle configuration scheme based on a health status of a passenger. For example, a user may indicate that a passenger will board the vehicle in a wheelchair or may be connected to a sensor or other health machinery. The controller 110 may determine a vehicle configuration scheme that will provide an adequate and comfortable space for the passenger to board the vehicle, have adequate space in the vehicle, and comfortably ride in the vehicle.

Figure 2:
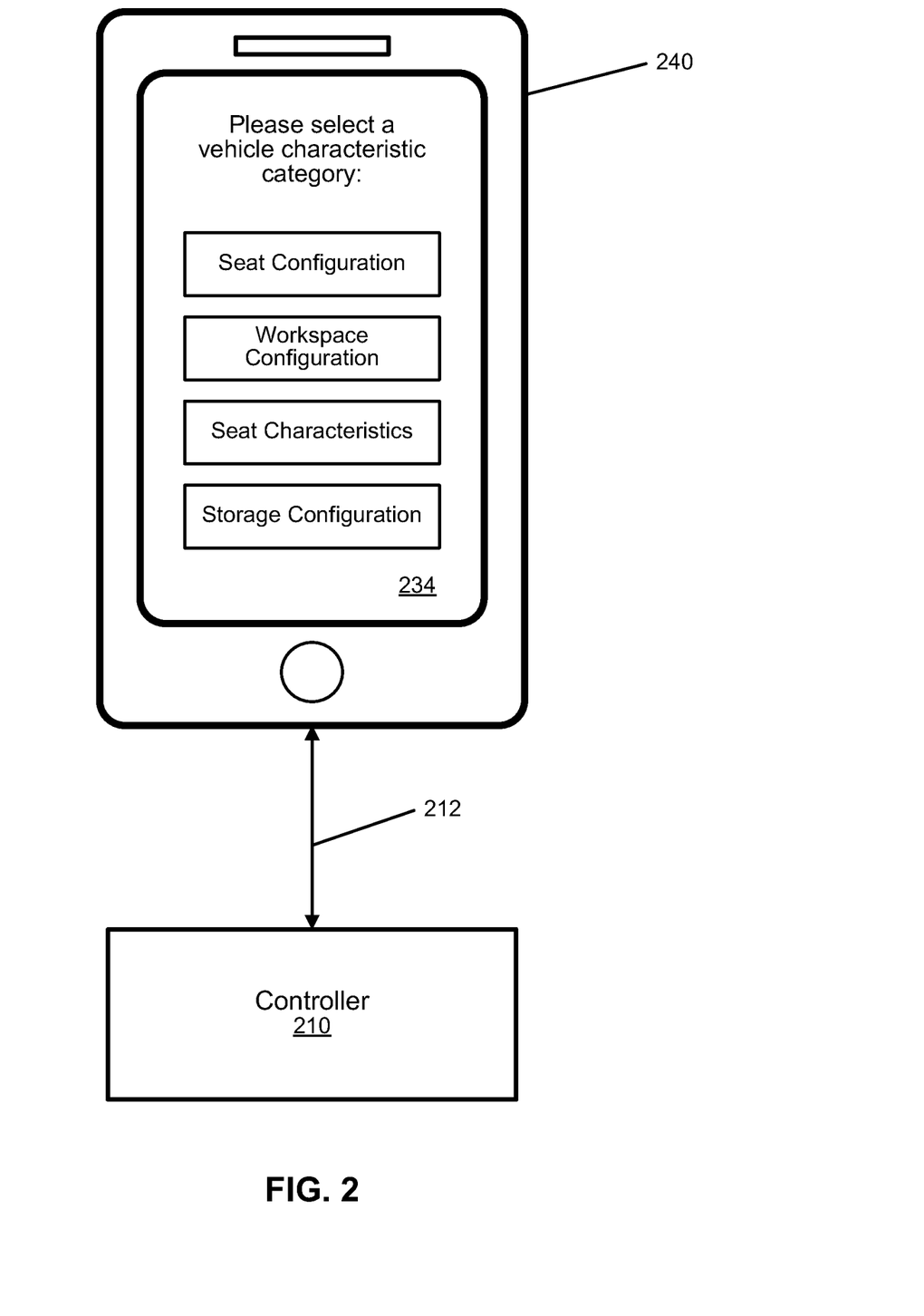
FIG. 2 is a schematic diagram illustrating a mobile device communicating with a controller in a dynamic vehicle reservation system, according to one implementation.

FIG. 2 is a schematic diagram of a mobile device 240 communicating with a controller 210 over a wired or wireless communication link 212. The mobile device 240 displays a user interface 234 that may be provided by, for example, a website or a mobile phone application. The mobile device 240 may communicate directly or indirectly (e.g., via a network and/or server) with the controller 210. A user, such as a passenger, a driver, or a vehicle renting company, may input data using the user interface 234 and the data may be communicated 212 to the controller 210, dynamic reservation server 134, database 136, and/or vehicle identification component 112. In an implementation, the mobile device 240 automatically communicates location data to the controller 210, dynamic reservation server 134, and/or database 136. In an implementation, a user may input data such as, for example, route data, reservation data, occupancy data, seat orientation data, seat configuration data, workspace configuration data, storage configuration data, and seat characteristic data.

It should be noted that a device may communicate with the controller 210 in a plurality of different ways without departing from the scope of the disclosure. In an implementation, a mobile device 240 has network access, such as cellular network access or wireless Internet access such as Wi-Fi or a hotspot, and the mobile device 240 may communicate with the controller 240 over a network 130. In an implementation, a device is in direct electronic communication with the controller 240 using an available wireless communication scheme such as Wi-Fi, Bluetooth, or the like.

Figure 3:
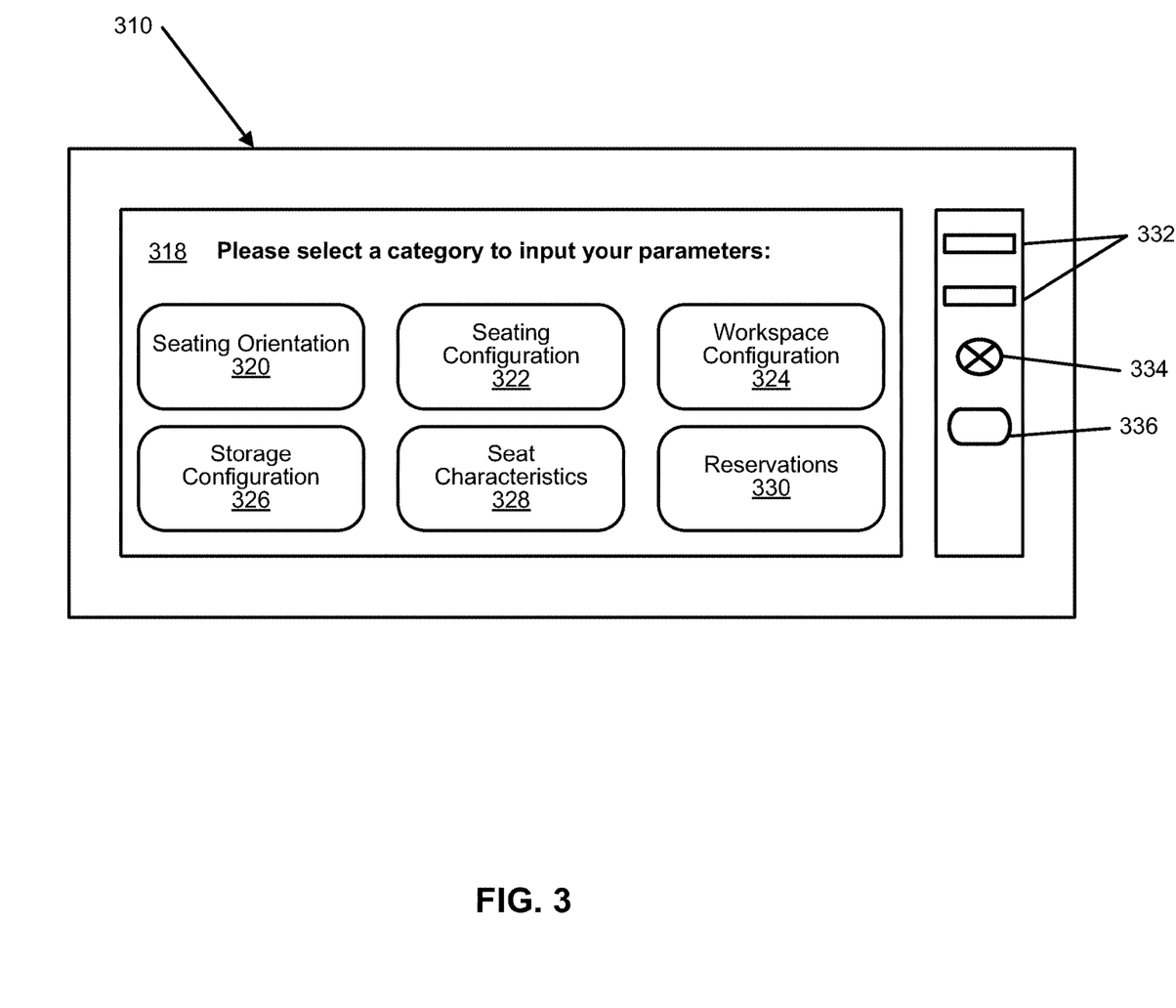
FIG. 3 is a schematic diagram illustrating a controller having a user interface, according to one implementation.

FIG. 3 is a schematic drawing of a controller 310 with a graphical interface 318 in accordance with an embodiment of the invention. The controller 310 includes a graphical interface 318 that is displayed on a screen, such as a touch screen, or other user interface. The controller 310 may include ports for enabling electronic communication with the controller 310. The ports may include, for example, USB ports 332, auxiliary ports 334, or any other port 336 known in the art. The controller 310 may be in electronic or wireless communication with, for example, a network interface 132, a sensor, a database 136, a computer 138, a mobile device 140, or any other device useful to the application and known in the art. The controller 310 may include options for a user to input parameters or data. A user may input, for example, vehicle characteristic preferences, such as seat orientation or configuration preferences, workspace configuration preferences, or storage configuration preferences. A user may input a plurality of other data points including, for example, seating orientation data 320 seating configuration data 322, workspace configuration data 324, storage configuration data 326, seat characteristic data 328, and reservation data 330.

Figure 4:
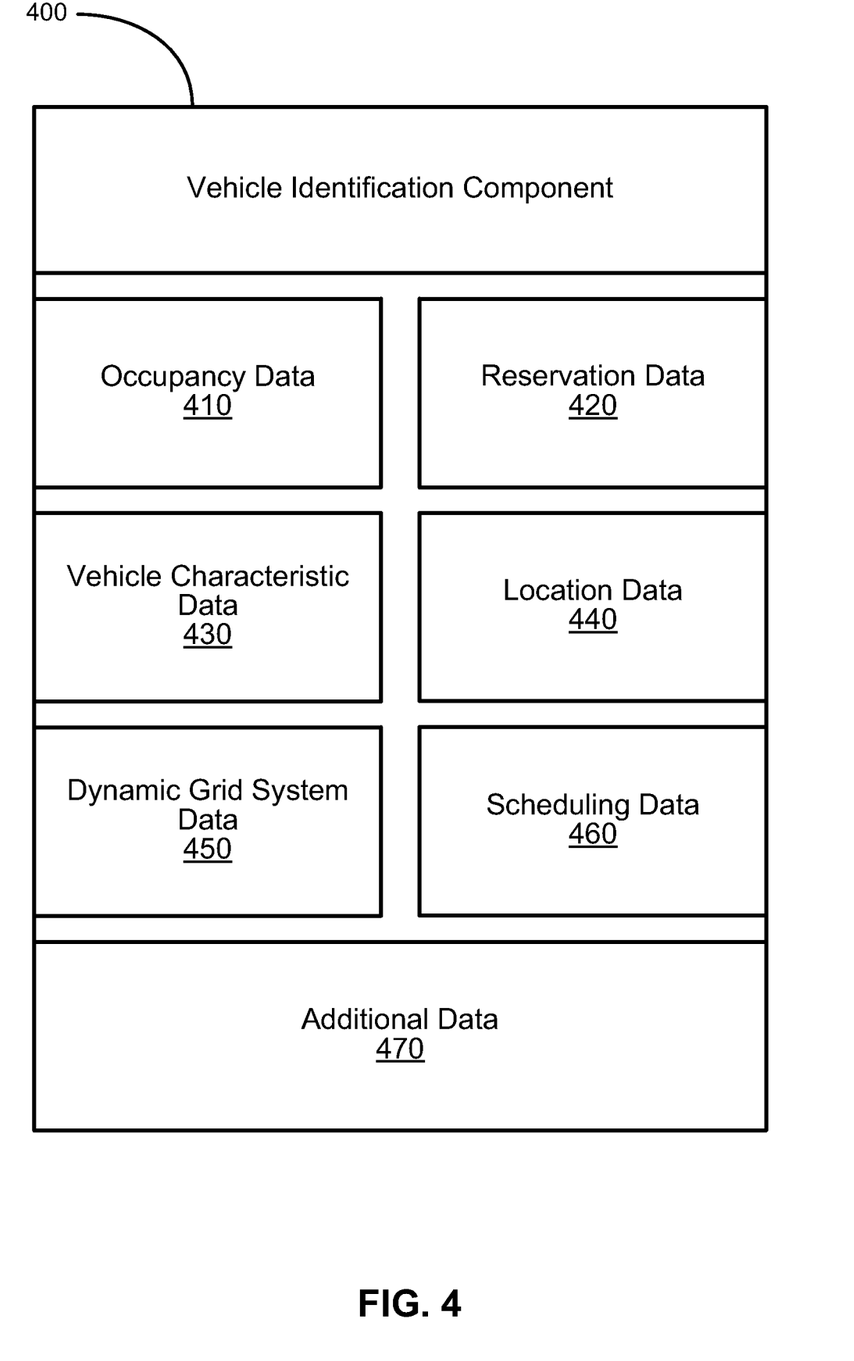
FIG. 4 is a schematic diagram illustrating a vehicle identification component, according to one implementation.

FIG. 4 is a schematic block diagram of a vehicle identification component 400 in accordance with an embodiment. The vehicle identification component 400 may be configured to identify an available vehicle capable of providing the desired vehicle characteristic based on a plurality of parameters 410, 420, 430, 440, 450, 460, and 470.

In one embodiment, the data parameters include occupancy data 410 that indicates an occupancy status of a vehicle or seat. The occupancy data 410 may indicate whether the vehicle or seat is currently occupied, by whom it is occupied, how long it will be occupied, and/or when it is expected to be occupied. The reservation data 420 may indicate a reservation status of a vehicle or seat, including whether a vehicle or seat is reserved, by whom it is reserved, and/or when it is reserved.

The vehicle characteristic data 430 includes any data indicating a user's desired vehicle characteristic(s) or the vehicle characteristic(s) of a vehicle in the system 100. The vehicle characteristic data 430 may include, for example, a user's desired vehicle characteristic. A user's desired vehicle characteristic may indicate that the user wishes to reserve a vehicle that includes, for example, a seating arrangement for a particular number of persons to face each other and interact during transit, a table or other workspace next to one or more seats, an electronic charging port attached to a seat, a monitor or television mounted near a seat, a luggage storage unit near a seat, a bicycle storage unit on the vehicle, and/or a sleeping space on the vehicle. The vehicle characteristic data 430 may include any data indicating the possible vehicle characteristics of a vehicle in the system 100. The possible vehicle characteristics 430 may indicate, for example, that a vehicle is capable of seating a particular number of people, that a vehicle is capable of providing a sleeping space, that a vehicle is capable of storing luggage or bicycles, that a vehicle is capable of providing a group workspace for a particular number of people, or that a vehicle is equipped with electronic charging stations, televisions, monitors, and the like. The vehicle characteristic data 430 may further indicate a make and model of a vehicle, a year of manufacture of a vehicle, a service record of a vehicle, an accident record of a vehicle, a color of a vehicle, or any other data concerning the vehicle that may be useful to the vehicle identification component 400.

The location data 440 may indicate, for example, a location of a vehicle, a location of the vehicle's route, or a location of a driver or passenger. The location data 440 may be received from a GPS unit attached to a vehicle or, for example, a passenger's mobile device. The location data 440 may be used to indicate when a dynamic grid system 120 should be engaged, for example, based on the proximity of a passenger to a vehicle or a proximity of a vehicle to a reserved pickup location.

The dynamic grid system data 450 may indicate any data associated with a dynamic grid system 120 in a vehicle. The dynamic grid system data 450 may indicate, for example, whether the dynamic grid system 120 is currently functional, the current configuration of the grid system 120, how the grid system 120 may be altered, and how long it may take for the grid system 120 to be altered to a particular configuration. The dynamic grid system data 450 may further indicate if the grid system 120 is completely autonomous and may be engaged while the vehicle is en route to a desired pickup location. The dynamic grid system data 450 may further indicate all possible configuration options for the dynamic grid system 120 including, for example, the number of seats available and the possible orientations and configurations of the seats, the workspace options available and the possible orientations and configurations of the workspace options, the storage options available and the particular storage orientations and configurations available, and the vehicle characteristics available such as electronic charging stations, televisions, monitors, sleeping spaces, and the like.

The scheduling data 460 may include any data about a vehicle's schedule. The scheduling data 460 may indicate, for example, that a vehicle is scheduled to pickup a passenger at a particular location with a particular vehicle configuration scheme, and that the vehicle will be available for reservation at a particular time. The scheduling data 460 may indicate where a vehicle is anticipated to be located at a particular time. The scheduling data 460 may indicate the anticipated vehicle configuration scheme of the vehicle at a particular place and time. The scheduling data 460 may indicate the current vehicle configuration scheme of the vehicle and may indicate if the vehicle configuration scheme has been manually adjusted by an operator, passenger, or other user of the vehicle. The scheduling data 460 may indicate when the vehicle has been reserved, when the vehicle is available, and if the vehicle is in suitable working condition to be reserved.

Additional data 470 may include any other data that might be useful to the identification of an available vehicle that may provide a desired vehicle characteristic to a user. The vehicle identification component 400 may identify a suitable vehicle based on at least one of the data received from any source. In an implementation, the vehicle identification component 400 will identify an available vehicle that is capable of providing the desired vehicle characteristic, determine a vehicle configuration scheme that will provide the characteristic, determine a set of instructions for implementing the vehicle configuration scheme, and determine a pickup and drop-off time and location for the passenger.

Figure 5:
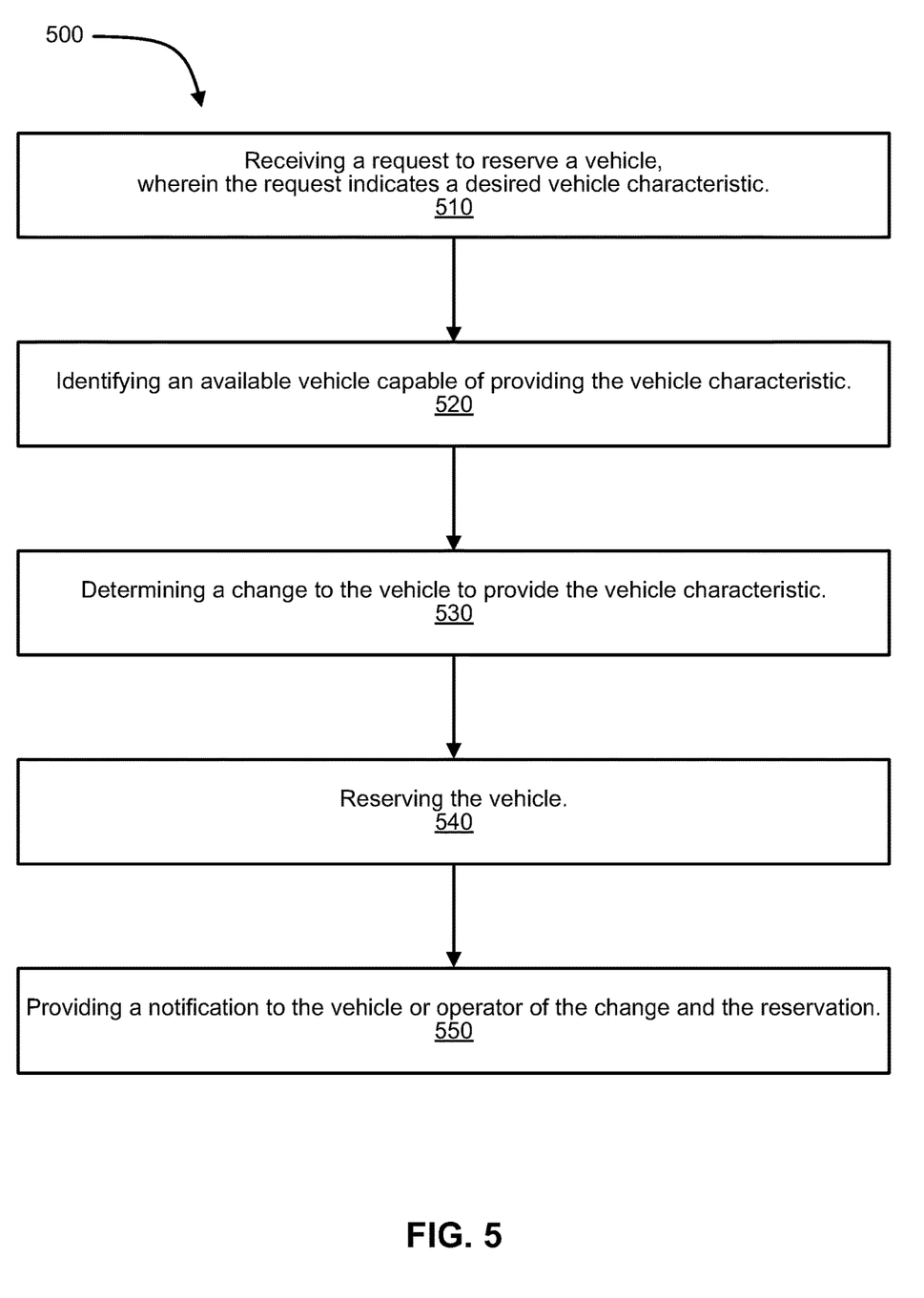
FIG. 5 is a schematic flow chart diagram illustrating a method for reserving a vehicle, according to one implementation.

FIG. 5 is a schematic flow chart diagram illustrating a method 500 of reserving a vehicle. The method 500 begins and a server receives a request to reserve a vehicle, wherein the request indicates a desired vehicle characteristic 510. A vehicle identification component of a server identifies an available vehicle capable of providing the vehicle characteristic 520. A server determines a change to the vehicle to provide the vehicle characteristic 530. A server reserves the vehicle 540. A server provides a notification to the vehicle or operator of the change and the reservation 550.

Figure 6:
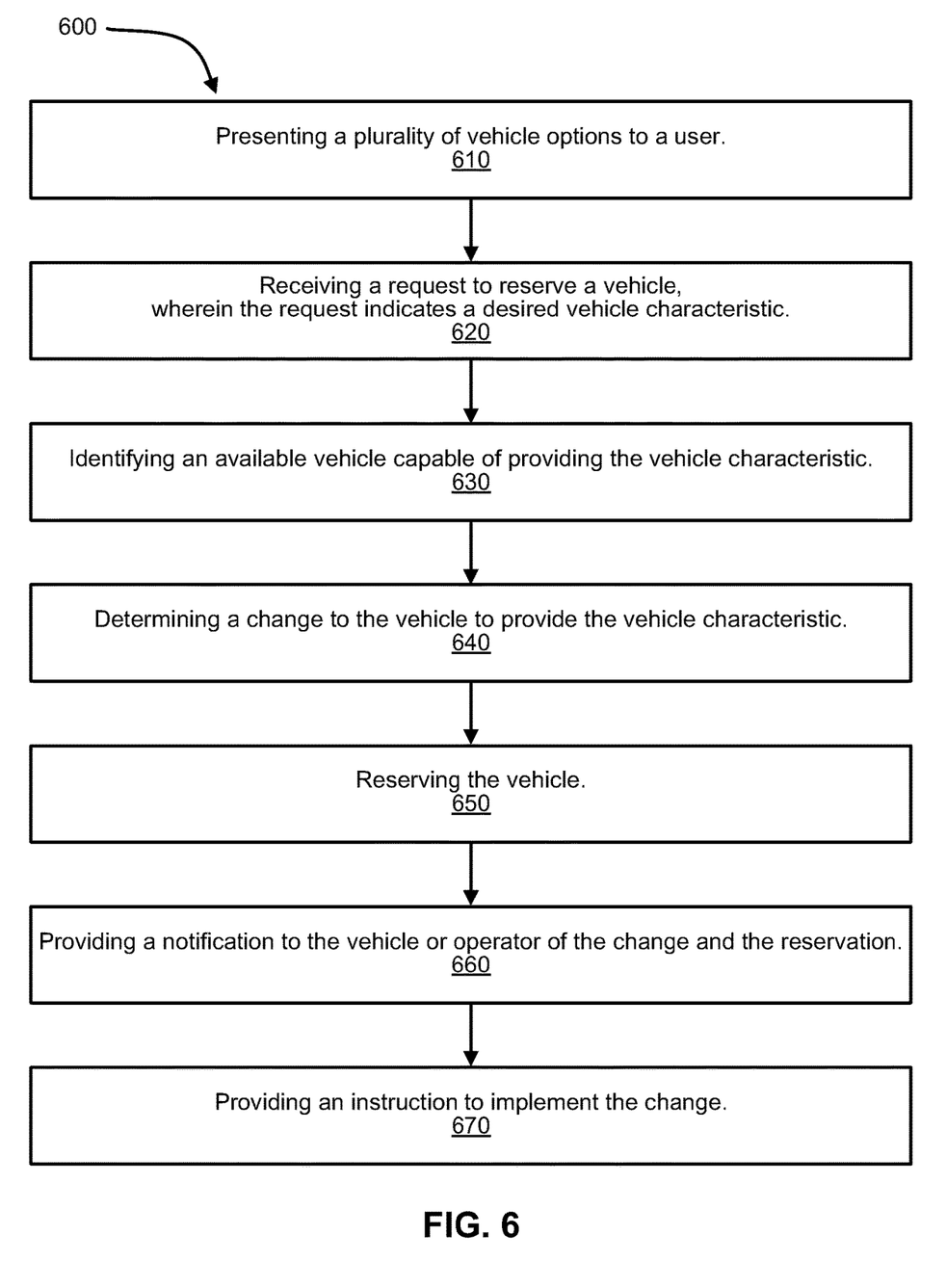
FIG. 6 is a schematic flow chart diagram illustrating a method for reserving a vehicle, according to one implementation.

FIG. 6 is a schematic flow chart diagram illustrating a method 600 for reserving a vehicle. The method 600 begins and a server presents a plurality of vehicle options to a user 610. A server receives a request to reserve a vehicle, wherein the request indicates a desired vehicle characteristic 620. A vehicle identification component of a server identifies an available vehicle capable of providing the vehicle characteristic 630. A server determines a change to the vehicle to provide the vehicle characteristic 640. A server reserves the vehicle 650. A server provides a notification to the vehicle or operator of the change and the reservation 660. A server provides an instruction to implement the change 670.

Figure 7:
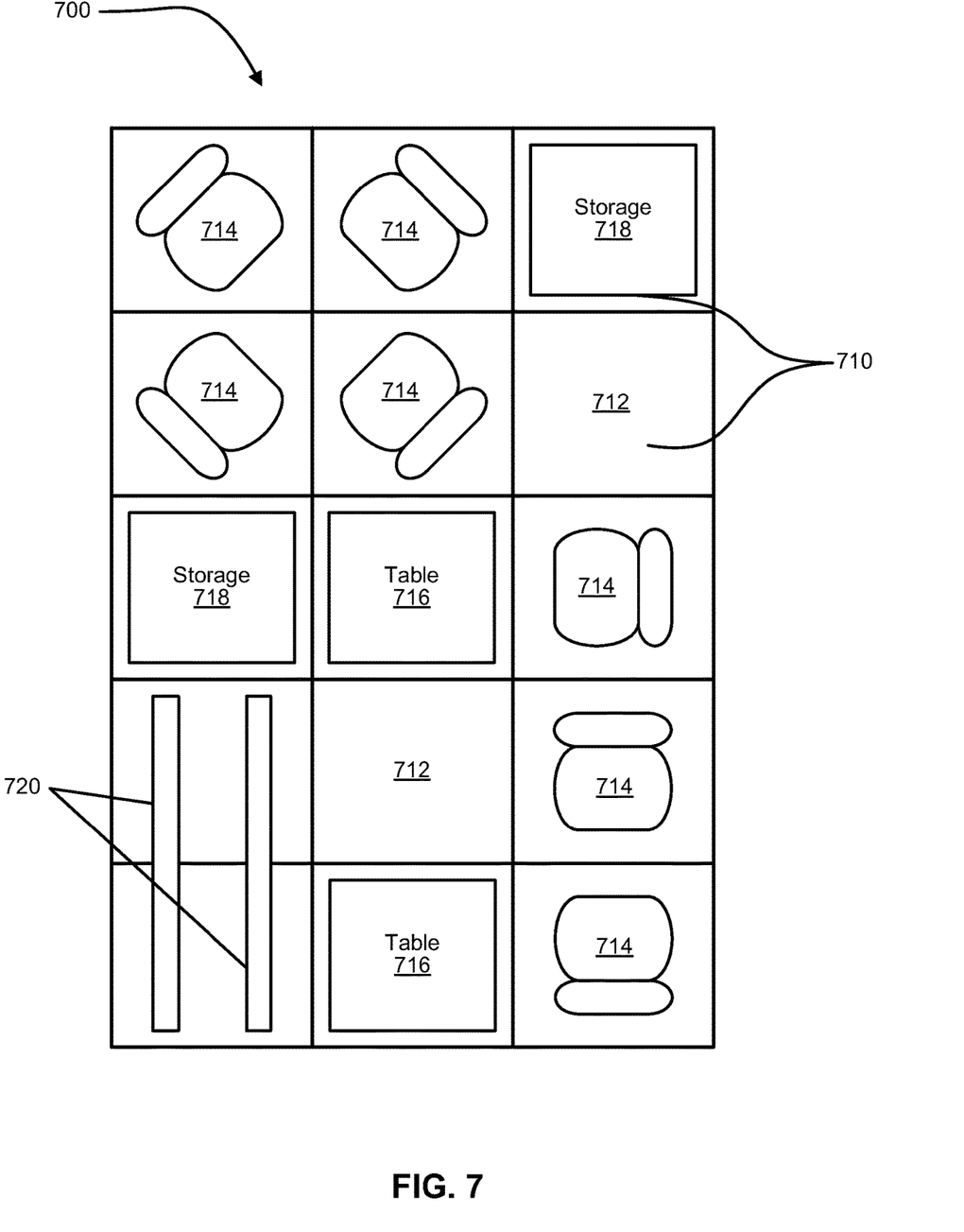
FIG. 7 is a schematic diagram of a dynamic vehicle grid system, according to one implementation.

FIG. 7 is a schematic diagram of a dynamic grid system 700 in accordance with an implementation. The dynamic grid system 700 may include a plurality of grid units 710. A grid unit 710 may include an empty space 712, a seat 714, a table or other workspace 716, a storage space 718, a specialized storage space 720 such as a bicycle storage space, or the like. It should be appreciated that a grid unit 710 may include a plurality of options or it may include any other option that is not disclosed but may be useful in the application of the dynamic grid system 700. Each of the grid units 710 may be attached to a track or other system. The dynamic grid system 700 may utilize a system including gears, chains, pulleys, or any other mechanical system known in the art to push, pull, or otherwise rearrange the grid units 710. The orientation of a grid unit 710 or the option attached to the grid unit 712, 714, 716, 718, and 720 may be rotated in any necessary direction or orientation.

The dynamic grid system 700 may be in electronic communication with a controller 110 located within the vehicle. The controller 110 may direct the dynamic grid system 700 to alter the arrangement of any of the grid units 710 to satisfy a desired vehicle characteristic received from a user. The dynamic grid system may be autonomous such that it may automatically adjust the position or orientation of any of the grid units 710 or options attached to the grid units. In an implementation, a user manually overrides the dynamic grid system 700 and manually alters the position or orientation of the any of the grid units 710 or options attached to the grid units.

Figure 8:
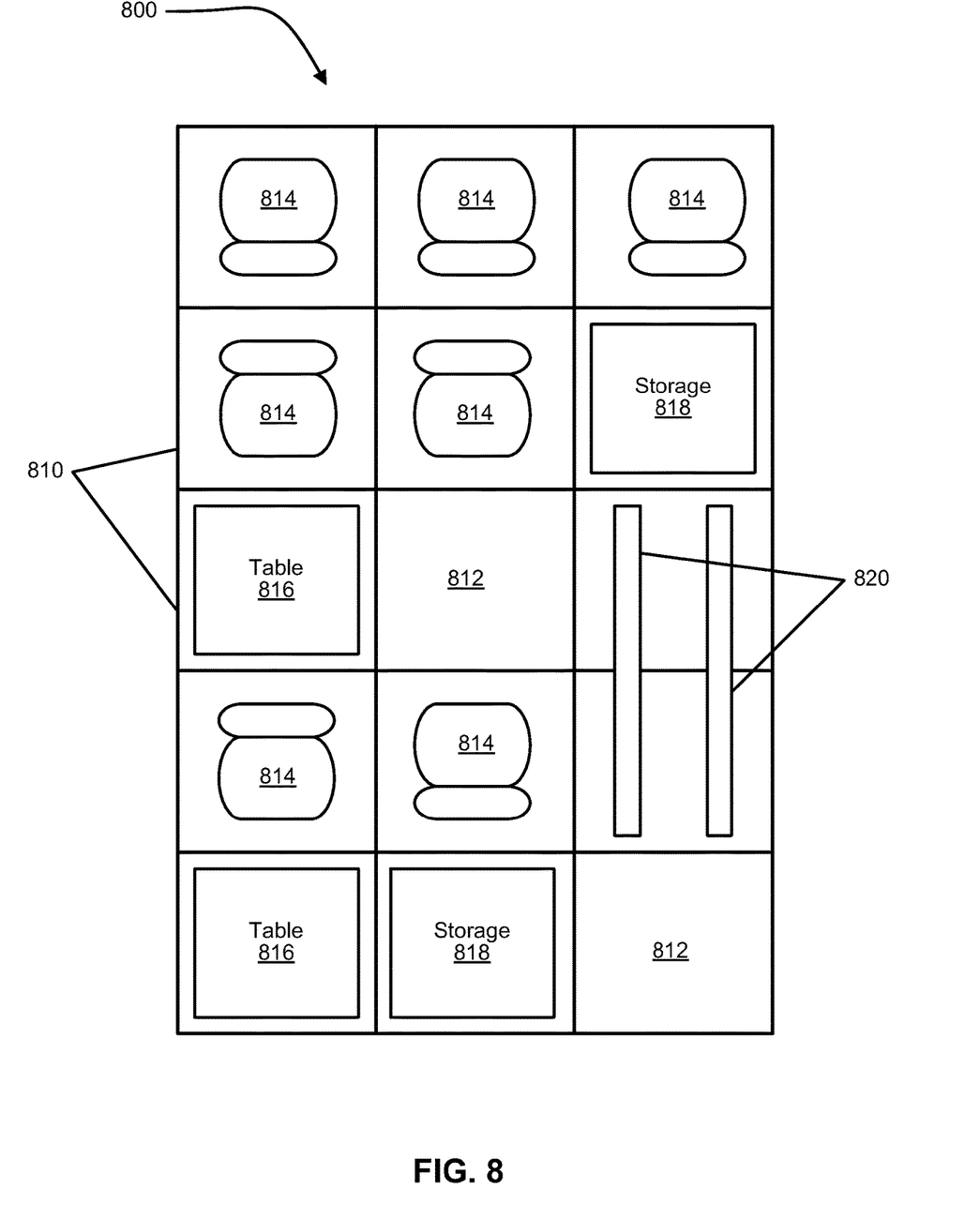
FIG. 8 is a schematic diagram of a dynamic vehicle grid system in a different configuration, according to one implementation.

FIG. 8 is a schematic diagram of a dynamic grid system 800 in accordance with an implementation. The dynamic grid systems 700, 800 in FIGS. 7 and 8 illustrates that a dynamic grid system 800 having the same options attached to the grid units 810 may be configured differently. The dynamic grid system 800 includes a plurality of grid units 810 with different options attached thereon. A grid unit 810 may include an empty space 812, a seat 814, a table or other workspace 816, a storage unit 818, or a specialized storage unit 820 such as a bicycle storage unit.

In an implementation, the controller 110 determines a set of instructions for implementing the desired vehicle configuration scheme. The controller 110 may receive the instructions over a network 130, through a hardwire connection, or it may determine the instructions. The controller 110 may communicate or provide instructions to the dynamic grid system 800 to automatically implement the instructions to satisfy the user's desired vehicle configuration scheme. In an implementation, the dynamic grid system 800 alters the position or orientation of a plurality of grid units 810 until the user's desired vehicle configuration scheme is met. In an implementation, an autonomous vehicle drives to a user's desired vehicle location at a particular time, and the dynamic grid system 800 engages to modify the configuration en route.

Figure 9:
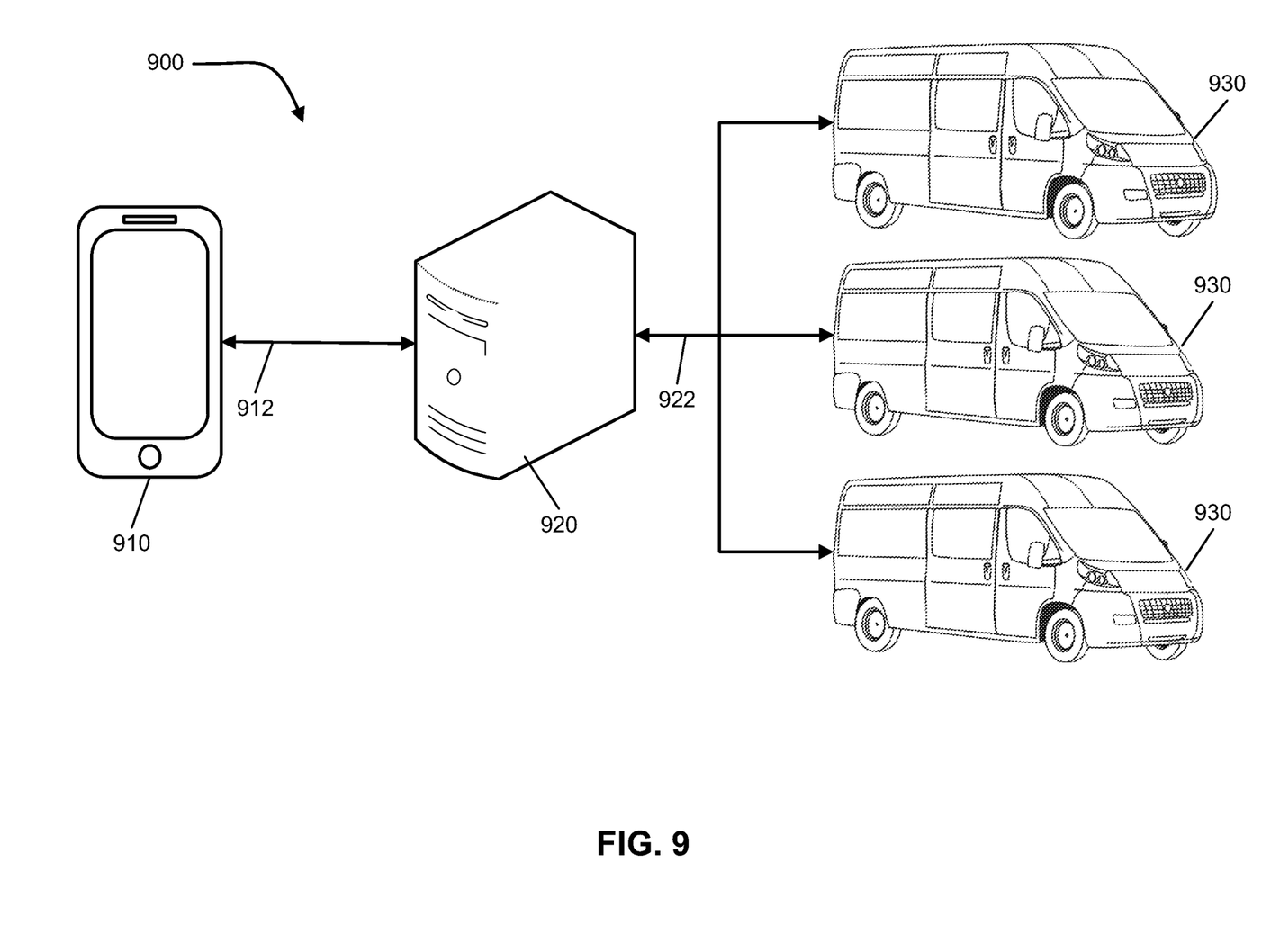
FIG. 9 is a schematic diagram of a communication system in a dynamic vehicle reservation system, according to one implementation.

FIG. 9 is a schematic diagram of a communication system 900 in a user input configured vehicle reservation system. The system 900 includes a device 910 having a user interface. The device 910 may include, for example, a mobile device 140 such as a cell phone or tablet, a computer 138, or any other device. The device 910 communicates 912 with a server 920. The server 920 communicates 922 with any of a plurality of vehicles 930. The server 920 may communicate with a controller 110 located within the vehicle 930.

The device 910 and the server 920 may have bidirectional communication 912. For example, the server 920 may provide a web interface or other information for display on the device 910 to allow a user to indicate options or characteristics for a vehicle. In an implementation, the device 910 communicates with the server 920 to indicate that a user has requested to reserve a vehicle with a desired vehicle characteristic. In an implementation, the server 920 communicates with the device 910 to indicate that a vehicle having the desired vehicle characteristic has been reserved for the user at a particular pickup time and location.

The server 920 and the plurality of vehicles 930 may have bidirectional communication 922. In an implementation, the server 920 indicates to a controller 110 within the vehicle 930 that the vehicle has been reserved for pickup at a particular time and location. The server 920 indicates any desired vehicle characteristic that were requested by the user, a vehicle configuration scheme, an instruction for implementing the vehicle configuration scheme, or any other data that may be useful to the system 900. In an implementation, a controller 110 in a vehicle 930 may communicate 922 with the server 920 to indicate, for example, that the vehicle 930 has received the reservation request and/or the desired vehicle configuration scheme, that the dynamic grid system 120 onboard the vehicle 930 is functional and will engage to implement the desired vehicle configuration scheme, or that the vehicle is currently located at or near the pickup location and is prepared to be reserved.

In an implementation, the server 920 receives a reservation request from a user including a desired vehicle characteristic or vehicle configuration scheme. The vehicle identification component 112 determines if there is an available vehicle. The server 920 further determines whether a vehicle is capable of providing the desired vehicle characteristic or vehicle configuration scheme based on, for example, data from a database 136, data received from a computer 138 or mobile device 140, or data received from a controller 110 onboard the vehicle. The data indicates, for example, the current vehicle configuration, the vehicle options such as number of seats, number of storage spaces, number of workspaces, and the possible vehicle configurations such as a particular number of seats facing each other in a conference area, a particular workspace configuration, or a particular storage configuration. In an implementation, the server 920 determines if a vehicle is capable of satisfying a desired vehicle characteristic or desired vehicle configuration scheme by searching a database for vehicles that include the needed vehicle options. The server 920 further checks for conflicts in altering the current configuration scheme of the vehicle to satisfy the desired vehicle configuration scheme.

In an implementation, the server 920 identifies a vehicle that can provide the desired vehicle configuration scheme through the vehicle identification component 112. The server 920 or an onboard controller 110 further determines how to engage the dynamic grid system 700, 800 to provide the desired vehicle configuration scheme. The server 920 determines, for example, if a grid unit needs to be moved or if a particular option, such as a seat, a table, or a storage space, needs to be rotated on the attached grid unit. In an implementation, the server 920 determines instructions for engaging the dynamic grid system 700, 800 by running through a plurality of instructions options and determining if an instructions option can successfully satisfy the desired vehicle characteristic based on the current vehicle configuration scheme of the vehicle. If the server 920 determines that one of the plurality of instructions options can successfully satisfy the desired vehicle characteristic, then the server 920 will provide 922 the instructions to a controller 110 onboard an identified vehicle 930. The controller 110 will engage the dynamic grid system 700, 800 at the appropriate time or location to ensure the desired vehicle configuration scheme is provided to the user at the desired time or location. The controller 110 will provide 922 an indication to the server 920 when the dynamic grid system 700, 800 has successfully completed the instructions and provided the desired vehicle configuration scheme. The server 920 may further provide an indication 912 to a device 910 that the vehicle has successfully been changed to provide the desired vehicle configuration scheme.

Figure 10:
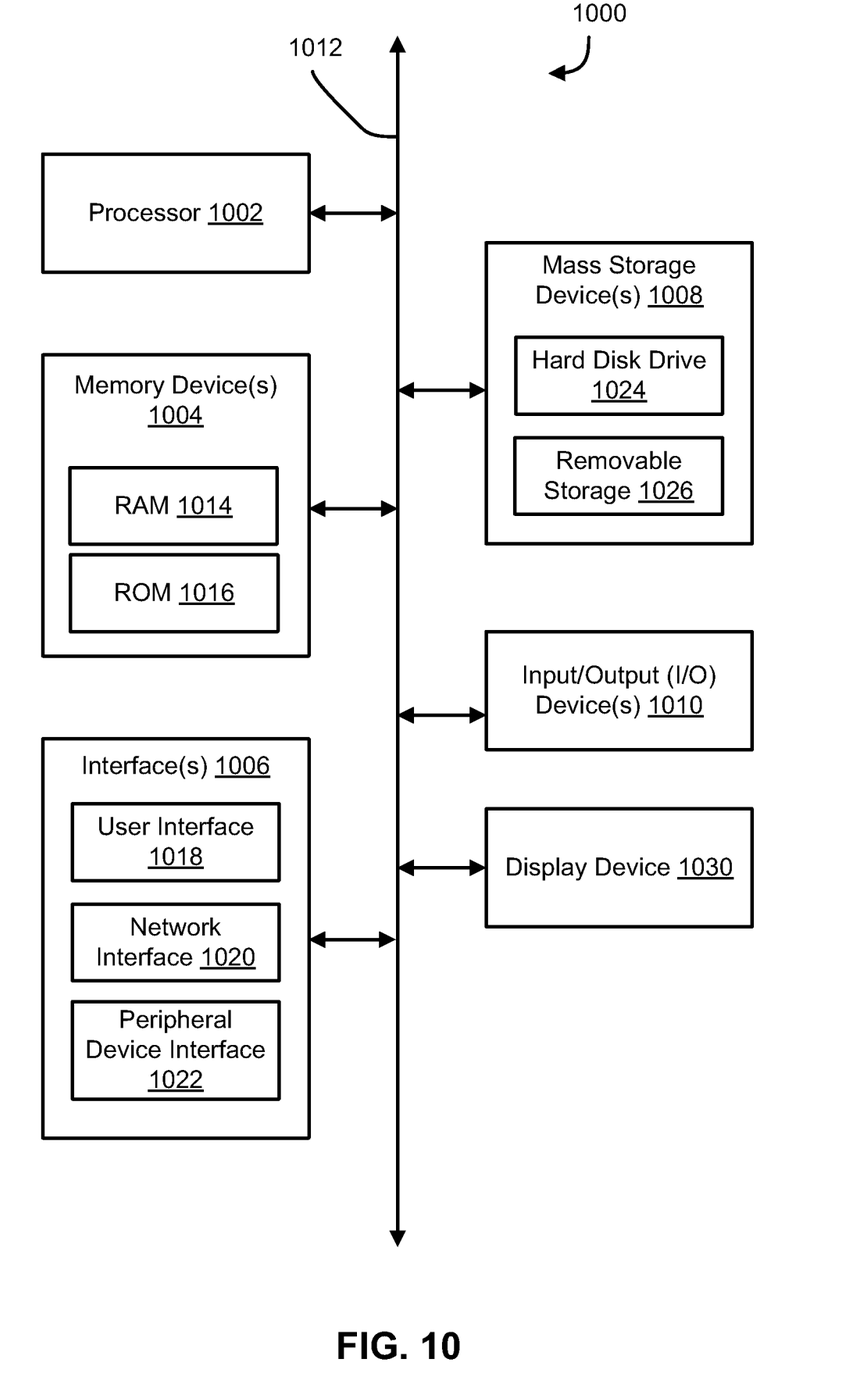
FIG. 10 is a schematic block diagram illustrating an example computing device, according to one implementation.

FIG. 10 is a schematic block diagram of an example computing device 1000.

Computing device 1000 may be used to perform various procedures, such as those discussed herein. Computing device 1000 can function as a dynamic vehicle reservation system 100, vehicle identification component 112, controller 110, dynamic reservation server 134, mobile device 140, or other user or system device. Computing device 1000 can perform various functions as discussed herein, such as receiving a request, determining an illumination scheme, processing a reservation, and processing functionality described herein. Computing device 1000 can be any of a wide variety of computing devices, such as a desktop computer, in-dash vehicle computer, vehicle control system, a notebook computer, a server computer, a handheld computer, tablet computer, and the like.

Computing device 1000 includes one or more processor(s) 1002, one or more memory device(s) 1004, one or more interface(s) 1006, one or more mass storage device(s) 1008, one or more Input/Output (I/O) device(s) 1010, and a display device 1030 all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile memory (e.g., random access memory (RAM) 1014) and/or nonvolatile memory (e.g., read-only memory (ROM) 1016). Memory device(s) 1004 may also include rewritable ROM, such as Flash memory.

Mass storage device(s) 1008 include various computer readable media, such as magnetic tapes, magnetic disks, optical disks, solid-state memory (e.g., Flash memory), and so forth. As shown in FIG. 10, a particular mass storage device is a hard disk drive 1024. Various drives may also be included in mass storage device(s) 1008 to enable reading from and/or writing to the various computer readable media. Mass storage device(s) 1008 include removable media 1026 and/or non-removable media.

I/O device(s) 1010 include various devices that allow data and/or other information to be input to or retrieved from computing device 1000. Example I/O device(s) 1010 include cursor control devices, keyboards, keypads, microphones, monitors, or other display devices, speakers, printers, network interface cards, modems, and the like.

Display device 1030 includes any type of device capable of displaying information to one or more users of computing device 1000. Examples of display device 1030 include a monitor, display terminal, video projection device, and the like.

Interface(s) 1006 include various interfaces that allow computing device 1000 to interact with other systems, devices, or computing environments. Example interface(s) 1006 may include any number of different network interfaces 1020, such as interfaces to local area networks (LANs), wide area networks (WANs), wireless networks, and the Internet. Other interface(s) include user interface 1018 and peripheral device interface 1022. The interface(s) 1006 may also include one or more user interface elements 1018. The interface(s) 1006 may also include one or more peripheral interfaces such as interfaces for printers, pointing devices (mice, track pad, or any suitable user interface now known to those of ordinary skill in the field, or later discovered), keyboards, and the like.

Bus 1012 allows processor(s) 1002, memory device(s) 1004, interface(s) 1006, mass storage device(s) 1008, and I/O device(s) 1010 to communicate with one another, as well as other devices or computers couples to bus 1012. Bus 1012 represents one or more of several types of bus structures, such as system bus, PCI bus, IEEE bus, USB bus, and so forth.

For purposes of illustration, programs and other executable program components are shown herein as discrete blocks, although it is understood that such programs and components may reside at various times in different storage components of computing device 1000, and are implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method for reserving a vehicle. The method includes receiving a request to reserve a vehicle from a user device, wherein the request indicates a desired vehicle characteristic. The method includes identifying an available vehicle capable of providing the vehicle characteristic, determining a change to the vehicle to provide the vehicle characteristic, reserving the vehicle, and providing a notification to the vehicle or operator of the change and the reservation.

Example 2 is a method as in Example 1, wherein providing a notification to the vehicle includes providing the notification to an autonomous vehicle and the vehicle implements the change without manual intervention.

Example 3 is a method as in any of Examples 1-2, wherein providing a notification to the vehicle includes providing the notification of the reservation to an autonomous vehicle and the vehicle drives to a reservation pickup location without manual intervention.

Example 4 is a method as in any of Examples 1-3, wherein determining a change to the vehicle to provide the vehicle characteristic includes determining a vehicle configuration scheme that includes a vehicle configuration option that is associated with the vehicle.

Example 5 is a method as in any of Examples 1-4, further comprising presenting a plurality of vehicle options to the user device, wherein the request indicates the desired vehicle characteristic that was selected from the plurality of vehicle options.

Example 6 is a method as in any of Examples 1-5, further comprising providing a notification that the vehicle has been reserved to the user that requested the vehicle.

Example 7 is a method as in any of Examples 1-6, wherein the vehicle characteristic indicates at least one of a seat configuration, a seat orientation, a seat characteristic, a workspace configuration, or a storage configuration.

Example 8 is a system for reserving a vehicle. The system includes a receiver configured to receive a request to reserve a vehicle, wherein the request indicates a desired vehicle characteristic. The system includes a controller configured to determine a change to the vehicle that will satisfy the vehicle characteristic, and the system includes an implementation component configured to implement the change to the vehicle.

Example 9 is a system as in Example 8, wherein the implementation component is configured to implement at least one of a seat configuration, a seat orientation, a seat characteristic, a workspace configuration, or a storage configuration.

Example 10 is a system as in any of Examples 8-9, wherein the vehicle is an autonomous vehicle and the implementation component is configured to implement the change to the vehicle without manual intervention by a user.

Example 11 is a system as in Example 10, wherein the implementation component further includes a dynamic grid system and wherein the implementation component is configured to implement the change by engaging the dynamic grid system.

Example 12 is a system as in Example 11, wherein the dynamic grid system further includes a grid unit and the dynamic grid system may alter at least one of a position or an orientation of the grid unit.

Example 13 is a system as in Example 12, wherein the grid unit is attached to at least one of a seat, a chair, a table, a luggage storage unit, or a bicycle storage unit.

Example 14 is a system as in any of Examples 8-13, wherein the desired vehicle characteristic indicates at least one of a seat orientation, a seat configuration, a storage configuration, a workspace configuration, or a seat characteristic.

Example 15 is a system as in any of Examples 8-14, further comprising a vehicle identification component configured to identify an available vehicle capable of providing the vehicle characteristic.

Example 16 is a system as in any of Examples 8-15, further comprising a notification component configured to provide a notification of at least one of a reservation status of the vehicle or a vehicle characteristic status of the vehicle.

Example 17 is a system as in any of Example 8-16, further comprising a user interface configured to present a plurality of vehicle options to a user and wherein the request indicates the desired vehicle characteristic that was selected from the plurality of vehicle options.

Examples 18 is a system as in any of Examples 8-17, wherein the implementation component is configured to provide a notification of the change to an operator of the vehicle.

Example 19 is a system as in any of Examples 8-18, wherein the controller is further configured to determine a schedule for the vehicle based on a plurality of requests to reserve the vehicle at different times.

Example 20 is a computer-readable storage media storing instructions that, when executed by one or more processors, causes the one or more processors to: receive a request over a network to reserve a vehicle, wherein the request indicates a desired vehicle characteristic, identify a vehicle capable of providing the vehicle characteristic, determine a change to the vehicle that will satisfy the characteristic, and reserve the vehicle.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, and/or the like. As one skilled in the art will appreciate, components may be referred to by different names. This document does not intend to distinguish between components that differ in name, but not function.

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method for reserving a vehicle, the method comprising:
   receiving a request to reserve a vehicle from a user device, wherein the request indicates a desired vehicle characteristic;
   identifying an available vehicle capable of providing the vehicle characteristic;
   determining a change to the vehicle to provide the vehicle characteristic;
   reserving the vehicle;
   providing a notification to the vehicle or operator of the change and the reservation; and
   changing the vehicle to provide the vehicle characteristic when the user device is within a threshold distance of the vehicle,
   wherein the vehicle characteristic indicates a seat configuration, a seat orientation, a seat characteristic, a workspace configuration, and a storage configuration.

2. The method of claim 1, wherein providing a notification to the vehicle comprises providing the notification to an autonomous vehicle and the vehicle implements the change without manual intervention.

3. The method of claim 1, wherein providing a notification to the vehicle comprises providing the notification of the reservation to an autonomous vehicle and the vehicle drives to a reservation pickup location without manual intervention.

4. The method of claim 1, wherein determining a change to the vehicle to provide the vehicle characteristic comprises determining a vehicle configuration scheme that includes a vehicle configuration option of all possible configuration options that are associated with the vehicle, wherein the all possible configuration options are based on a combination of available seats, available workspace options, and available vehicle features.

5. The method of claim 1, further comprising presenting a plurality of vehicle options to the user device, wherein the request indicates the desired vehicle characteristic that was selected from the plurality of vehicle options.

6. The method of claim 1, further comprising providing a notification that the vehicle has been reserved to the user that requested the vehicle.

7. A system for reserving a vehicle, the system comprising:
    a receiver configured to receive a request to reserve a vehicle, wherein the request indicates a desired vehicle characteristic;
    a controller configured to determine a change to the vehicle that will satisfy the vehicle characteristic;
    a dynamic grid system configured to implement the change to the vehicle when a user device associated with the request is within a threshold distance of the vehicle; and
    a user interface configured to present a plurality of vehicle options to a user and wherein the request indicates the desired vehicle characteristic that was selected from the plurality of vehicle options, wherein the determination of the change to the vehicle that will satisfy the vehicle characteristic comprises determining a vehicle configuration scheme that includes a vehicle configuration option of all possible configuration options that are associated with the vehicle, and wherein the all possible configuration options are based on a combination of available seats, available workspace options, and available vehicle features.

8. The system of claim 7, wherein the dynamic grid system is configured to implement, via a track attached to each grid unit of the dynamic grid system, at least one of a seat configuration, a seat orientation, a seat characteristic, a workspace configuration, or a storage configuration.

9. The system of claim 7, wherein the vehicle is an autonomous vehicle and the dynamic grid system is configured to implement the change to the vehicle without manual intervention by a user.

10. The system of claim 7, wherein the vehicle is an autonomous vehicle and the controller is further configured to drive the vehicle without manual intervention to a pickup location associated with the request to reserve the vehicle.

11. The system of claim 7, wherein the dynamic grid system may alter at least one of a position or an orientation of a grid unit.

12. The system of claim 11, wherein the grid unit is attached to at least one of a seat, a chair, a table, a luggage storage unit, or a bicycle storage unit.

13. The system of claim 7, wherein the desired vehicle characteristic indicates a seat orientation, a seat configuration, a storage configuration, a workspace configuration, and a seat characteristic.

14. The system of claim 7, further comprising a vehicle identification component configured to identify an available vehicle capable of providing the vehicle characteristic.

15. The system of claim 7, further comprising a notification component configured to provide a notification of at least one of a reservation status of the vehicle or a vehicle characteristic status of the vehicle.

16. The system of claim 7, wherein the controller is configured to provide a notification of the change to an operator of the vehicle.

17. The system of claim 7, wherein the controller is further configured to determine a schedule for the vehicle based on a plurality of requests to reserve the vehicle at different times.

18. A method for reserving a vehicle, the method comprising:
    receiving a request to reserve a vehicle from a user device, wherein the request indicates a desired vehicle characteristic;
    identifying an available vehicle capable of providing the vehicle characteristic;
    determining a change to the vehicle to provide the vehicle characteristic;
    reserving the vehicle;
    providing a notification to the vehicle or operator of the change and the reservation; and
    changing the vehicle to provide the vehicle characteristic when the user device is within a threshold distance of the vehicle,
    wherein determining a change to the vehicle to provide the vehicle characteristic comprises determining a vehicle configuration scheme that includes a vehicle configuration option of all possible configuration options that are associated with the vehicle, wherein the all possible configuration options are based on a combination of available seats, available workspace options, and available vehicle features.

19. A system for reserving a vehicle, the system comprising:
    a receiver configured to receive a request to reserve a vehicle, wherein the request indicates a desired vehicle characteristic;
    a controller configured to determine a change to the vehicle that will satisfy the vehicle characteristic; and
    a dynamic grid system configured to implement the change to the vehicle when a user device associated with the request is within a threshold distance of the vehicle,
    wherein the desired vehicle characteristic indicates a seat orientation, a seat configuration, a storage configuration, a workspace configuration, and a seat characteristic.

* * * * *